US011773356B2

(12) United States Patent
Stockhausen

(10) Patent No.: US 11,773,356 B2
(45) Date of Patent: *Oct. 3, 2023

(54) METHOD FOR THE TREATMENT OF WOOD PARTICLES FOR THE PRODUCTION OF ALCOHOLIC BEVERAGES AND THEIR USE AND AN APPARATUS FOR THEIR USE

(71) Applicant: DDS PATENTE + LIZENZEN AG, Stans (CH)

(72) Inventor: Dolf Stockhausen, Stans (CH)

(73) Assignee: DDS PATENTE + LIZENZEN AG, Stans (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/736,975

(22) Filed: May 4, 2022

(65) Prior Publication Data

US 2022/0259530 A1 Aug. 18, 2022

Related U.S. Application Data

(63) Continuation of application No. 16/315,177, filed as application No. PCT/EP2017/080788 on Nov. 29, 2017.

(30) Foreign Application Priority Data

Nov. 13, 2017 (EP) ..................................... 17201433

(51) Int. Cl.
*C12G 3/07* (2006.01)
*C12G 1/00* (2019.01)
*C12H 1/22* (2006.01)

(52) U.S. Cl.
CPC .............. *C12G 3/07* (2019.02); *C12G 1/00* (2013.01); *C12H 1/22* (2013.01)

(58) Field of Classification Search
CPC ..................................... C12G 3/07; C12H 1/22
See application file for complete search history.

(56) References Cited

U.S. PATENT DOCUMENTS

| | | | |
|---|---|---|---|
| 2,119,234 | A | 5/1938 | Krebs et al. |
| 5,102,675 | A | 4/1992 | Howell et al. |
| 5,356,641 | A | 10/1994 | Bowen et al. |
| 6,132,788 | A | 10/2000 | Zimlich, III |
| 6,203,836 | B1 | 3/2001 | Gross et al. |
| 7,357,069 | B1 | 4/2008 | Karasch et al. |
| 9,637,712 | B2 | 5/2017 | Davis |
| 9,637,713 | B2 | 5/2017 | Davis |
| 2002/0168446 | A1 | 11/2002 | Zimlich, III et al. |
| 2005/0019027 | A1 | 1/2005 | Warren |
| 2005/0084597 | A1 | 4/2005 | Wasmund, Jr. |
| 2008/0028942 | A1 | 2/2008 | Kania et al. |
| 2008/0179328 | A1 | 7/2008 | Anderson |
| 2008/0279989 | A1 | 11/2008 | Ruttledge et al. |
| 2010/0092636 | A1 | 4/2010 | Watson et al. |
| 2011/0129589 | A1 | 6/2011 | Watson et al. |
| 2012/0164300 | A1 | 6/2012 | Niazi |

FOREIGN PATENT DOCUMENTS

| | | |
|---|---|---|
| EP | 634108 B1 | 8/2002 |
| GB | 621487 A | 4/1949 |
| WO | WO-2007052997 A1 * 5/2007 | ............. C12G 3/065 |

OTHER PUBLICATIONS

Non-Final Office Action dated May 18, 2022, issued in corresponding U.S. Appl. No. 16/315,177 (39 pgs.).
American Oak verses French Oak For Oak Barrels Used to Age Wine—Part Two Jul. 11, 2013, (3 pgs.) https://redheadoakbarrels.com/american-oak-verses-french-oak-for-oak-barrels-used-to-age-wine-part-two/ (2013).
Chris Colby, "Tannins in the Boil", Beer and Wine Journal, Feb. 10, 2014, (5 pgs.) https://beerandwinejournal.com/tannins-in-the-boil/ (2014).

* cited by examiner

*Primary Examiner* — Vera Stulii
(74) *Attorney, Agent, or Firm* — Pillsbury Winthrop Shaw Pittman, LLP

(57) ABSTRACT

There is provided a method for the treatment of wood particles for use in the production of alcoholic beverages, comprising the steps of: (a) washing the wood particles with water under agitation at a temperature of at least 60° C.; wherein the wood particles may optionally already be toasted; (b) removing the water from the wood particles; (c) thermally drying the wood particles; (d) toasting the wood particles to obtain wood particles according to the invention; (e) optionally, incubating the wood particles according to the invention with an aroma-bearing liquid, the subsequent removal of any overlying aroma-bearing liquid, and, optionally, the subsequent drying the wood particles according to the invention to obtain aromatised wood particles according to the invention.

20 Claims, No Drawings

METHOD FOR THE TREATMENT OF WOOD PARTICLES FOR THE PRODUCTION OF ALCOHOLIC BEVERAGES AND THEIR USE AND AN APPARATUS FOR THEIR USE

CROSS-REFERENCE TO RELATED APPLICATION(S)

The present application is a continuation of U.S. patent application Ser. No. 16/315,177, filed on Jan. 4, 2019, which is a National Phase Patent Application of International Patent Application Number PCT/EP2017/080788, filed Nov. 29, 2017, which claims priority to EP 17201433.4, filed on Nov. 13, 2017, the entire content of each of which is incorporated by reference herein.

FIELD OF THE INVENTION

The invention relates to a method for the treatment of wood particles for use in the production of alcoholic beverages. Furthermore, the invention relates to wood particles treated by the method according to the invention for use in the production of alcoholic beverages, further, to the use of the wood particles according to the invention for the treatment of alcoholic beverages, and finally to an apparatus for using the wood particles according to the invention for the treatment of alcoholic beverages.

BACKGROUND OF THE INVENTION

The maturation of alcoholic beverages in barrels for the purpose of aroma modification is practiced for centuries and universally. Thereby, aromas such as vanillins and wood sugars diffuse from the barrel walls into the stored liquids and, conversely, undesirable components of the liquids, such as certain alcohol molecules, diffuse into the wood of the barrels.

For many beverages such as, for example, for wine, barrel storage is often only of comparatively short duration, with other beverages, especially, malt whisky, it extends over several years. The selection of the barrels is believed to have the greatest influence on the aroma of whisky. Top whiskys usually have storage periods of 8-16 or even more years. Due to the capital bound in the stored distillates, the cost of the barrels, and the loss of evaporation, which is up to 2% and more of the alcohol per year, most of the manufacturing costs of, for example, malt whiskys are due to barrel aging.

The following discussions are illustrative of whisky, however, the lessons learned can be successfully transferred to other alcoholic beverages such as, for example, fruit brandies, rum, cognac, gin, wine or other alcoholic beverages.

The diffusion methods in barrel aging follow the laws of diffusion. In an application case such as the present one, the intensity of mass transfer between two media (at atmospheric pressure), here, a solid and a liquid media, depends on the contact surface, the ratio of the contact surface to the liquid volume, the reciprocal concentration gradient of the diffusing substances between the media, the temperature, and the contact time.

This results in the following disadvantages of barrel aging of alcoholic beverages: a) It is known from the theory of geometry that the sphere is the geometrical figure with the smallest surface to volume ratio. Since the commonly used wooden barrel comes close in geometry to the sphere, it results, that the barrel is, in principle, rather inadequate in view of the intensity of the desired substance diffusion methods.

b) It is customary to "toast" the inside of the barrel by direct flaming with and without direct contact with the wood, which is expected to result in caramelization of the wood sugars on the surface. The method is difficult to control. It is controversial, whether the potentially occurring "charring" supports the aroma diffusion. On the one hand "charring" increases the pores of the surface, on the other hand the ash contributes hardly any aromas.

c) Already at room temperature there is a high evaporation loss of alcohol. An increase in temperature is therefore only of very limited use for the barrel aging.

To compensate the mentioned disadvantages of barrel aging, only the time factor remains, which explains the long storage periods of whiskys of high quality.

In addition to the use of wooden barrels for alcoholic beverages, the use of wood chips is also known. For example, in certain wine areas (for example, in the Rioja, Spain) toasted and untoasted oak chips are preferably used for red wines. Such wood chips are also offered on the market for the maturation of spirits. However, no whisky, in particular, no top malt whisky, is known, to be produced this way.

Previous drawbacks with the use of wood chips for alcoholic beverages, especially for whisky, are, that the increased surface area of the wood chips also leads to an increased diffusion of the tannins contained in the wood into the whisky, resulting in an unpleasant bitter taste and aftertaste. This may in particular occur, when the wood chips consist of, for example, European oak wood, which by nature has a ten-fold higher tannin content compared to American oak wood.

Occasionally it is also criticized that wood chips do not allow additional aromatization steps such as, for example, the introduction of wine-rum-, cognac- and sweet grape-aromas by partial storage in used barrels with an appropriate initial filling of said aroma.

Corresponding experiments with wood chips from shredded dormers of such barrels, failed, because of the high tannin input, since an ideal-type cuboid wood chip can only be toasted and impregnated (with sherry etc.) on one side surface. On the other 5 side surfaces this wood chip has still the properties of untoasted raw oak wood.

In GB621487 and U.S. Pat. No. 2,119,234, the use of chemical agents and enzymes is suggested for the treatment of wood for the use of alcoholic beverages, which is disadvantageous, since it leads to foreign substances being able to enter the treated alcoholic beverages.

U.S. Pat. No. 9,637,712B2 and U.S. Pat. No. 9,637,713B2 present a time-consuming and technically complicated procedure for the production of mature distilled spirits, using wood and actinic light, at a temperature of 60-77° C. and a treatment time of twice about 12 and 24 to 336 hours, respectively.

It is therefore an object of the present invention to avoid the disadvantages mentioned in the prior art. It is another object of the present invention to provide a simple and improved method for the treatment of wood particles which optimizes the properties of wood particles for use in the production of alcoholic beverages. It is another object of the present invention to provide these optimized wood particles, as well as their use for the production of alcoholic beverages, and a suitable apparatus for using the wood particles according to the invention. These objects are achieved by the teachings of the independent claims. Further advantageous embodiments of the invention are the subject of the dependent claims.

Definitions

In the following some terms will be explained, which are used for the description of the invention.

For the purposes of the invention, the term "wood particles" means, for example, wood chips, wood flakes, wood granules, wood shavings or comparable wood particles of any shape and size.

For the purposes of the invention, the term "alcoholic beverages" means any kind of alcoholic beverages, such as, for example, whisky, fruit brandies, rum, cognac, gin, sherry, port wine, wine etc.

For the purposes of the invention, the term "agitation" means any form of agitation (movement), such as, for example, shaking, weighing, spinning, rotating, turning, etc.

For the purposes of the invention, the term "toasted wood particles" means, wood particles, which have been subjected to any form of heat influence, which contributes to aromatization, such as, for example, heating of the wood particles in an oven or an exposure to other heat sources, such as, for example, fire.

For the purposes of the invention, the term "removal of water" means any form of removal of water, such as, for example, spinning off, sieving off, straining off, pouring off, shaking off, etc.

The term "thermal drying of the wood particles" in the sense of the invention means any forms of thermal drying, such as, for example, by means of an oven or by means of another thermal source.

By the term "toasting the wood particles" in the sense of the invention, any form of heat influence on wood particles contributing to aromatization, is meant, such as, for example, heating the wood particles in an oven, or the exposure to other heat sources, such as, for example, fire.

For the purposes of the invention, the term "incubation of the wood particles according to the invention with an aroma-bearing liquid" means any form of incubation of the wood particles according to the invention with a liquid for any incubation period, such as, for example, overlaying the wood particles according to the invention with the aroma-bearing liquid or other forms of contact between the wood particles and the liquid.

For the purposes of the invention, the term "incubations of the alcoholic beverage with the wood particles according to the invention" means any form and duration of the incubation.

For the purposes of the invention, the term "oven" means any type of oven that enables a baking method.

For the purposes of the invention, the term "aroma-bearing liquid" means any liquids, which in any way make an aroma-enhancing contribution, such as, in particular, sherry, port wine, rum, cognac, gin, wine, fruit brandies, or others liquids.

For the purposes of the invention, the term "removing of any supernatant of aroma-bearing liquid" means any form of removal of a liquid, such as, for example, sieving-off, spinning-off.

For the purposes of the invention, the term "drying" means any form of drying, such as, for example, in an oven.

For the purposes of the invention, the term "small-scale wood particles" means various sizes of wood particles, which are considered to be small-scale for a person in the art, preferably small-scale wood particles have an edge length of about 2 mm.

For the purposes of the invention, the term "stirring unit" means any type of container provided with a stirrer.

For the purposes of the invention, the term "sieve unit" means any type of sieving unit, such as, for example, a basket, a sieve, or any other device which, in whole or in part, especially on the ground, is made from a perforated material or from a perforated material mesh- or lattice-like mesh and which serves to sort out solid from a liquid or to separate smaller substances from the larger ones.

SUMMARY OF THE INVENTION

Surprisingly, it was found that the disadvantages of the prior art can be overcome with the inventive method for the treatment of wood particles for the production of alcoholic beverages, as well as with the wood particles according to the invention, with the use of the wood particles according to the invention for the production of alcoholic beverages, and with an apparatus according to the invention for the use of the wood particles according to the invention.

Further, surprisingly, it has been possible to establish a simple and improved method for the treatment of wood particles, which can optimize the properties of the wood particles for use in the production of alcoholic beverages. The use of these wood particles according to the invention for the production of alcoholic beverages, as well as the provision of an apparatus for the use of these wood particles according to the invention also enables an optimized production of alcoholic beverages.

There are a multitude of possibilities for designing and further developing the method according to the invention, the wood particles according to the invention, the use of the wood particles according to the invention and the apparatus according to the invention for using the wood particles according to the invention. For this purpose, reference is made, on the one hand, to the dependent claims, and, on the other hand, to description in the exemplary embodiments.

Although the invention will be described in conjunction with exemplary embodiments, it should be understood that the present description is not intended to limit the invention in any way to these exemplary embodiments. Rather, the invention is intended to cover not only the exemplary embodiments but also various alternatives, modifications, equivalents and additional embodiments which may be included within the spirit and scope of the invention, as defined by the claims.

The object of the present invention is achieved according to a first teaching with a method for the treatment of wood particles for use in the production of alcoholic beverages, comprising the following steps:

(a) washing the wood particles with water under agitation at a temperature of at least 60° C., wherein the wood particles may optionally already be toasted;

(b) removing the water from the wood particles;

(c) the thermal drying of the wood particles;

(d) toasting the wood particles to obtain wood particles according to the invention;

(e) optionally, the incubation of the wood particles according to the invention with an aroma-bearing liquid, followed by the subsequent removal of any supernatant aroma-bearing liquid and optionally the subsequent drying of the wood particles according to the invention to obtain aromatised wood particles according to the invention.

According to one embodiment of the method according to the invention, the wood particles are small-scale, preferably with an edge length of about 2 mm, moreover, the wood particles may have any shape, preferably, the shape of wood chips or wood cube.

Preferably, the wood particles are of any kind of wood, preferably, of oak, more preferably of American oak.

According to a further embodiment of the method according to the invention, the washing of the wood particles with water under agitation is carried out at a temperature of at least 60° C., preferably of at least 80° C., more preferably of at least 95° C.

Preferably, the washing of the wood particles with water under agitation is carried out for more than 1 hour, preferably for more than 5 hours, more preferably for more than 8 hours.

According to another embodiment of the method according to the invention, more than 5 liters of water per kg of wood particles should be used for washing the wood particles with water under agitation, preferably, more than 10 liters of water per kg of wood particles, and most preferably, more than 12 liters of water per kg of wood particles.

Preferably, the removal of the water from the wood particles can be done by various methods, preferably, by sieving or by suction, more preferably, by spinning.

According to one embodiment of the method according to the invention, the thermal drying of the wood particles can be carried out by means of various methods, preferably, in an oven, more preferably, in an oven for about 15-30 minutes at about 180-200° C.; wherein, the toasting of the wood particles can be carried out by means of various methods, preferably, in a baking oven, more preferably in a baking oven for about 60 minutes at about 180-200° C.

Preferably, the optional incubation of the wood particles according to the invention with an aroma-bearing liquid can be carried out by various methods, preferably by overlaying the wood particles according to the invention with the aroma-bearing liquid; wherein the aroma-bearing liquid may be sherry, port wine, rum, cognac, gin, wine, any fruit brandy, or any other liquid with a desired aroma contribution.

According to a further embodiment of the method according to the invention, the optionally incubated wood particles with aroma-bearing liquid may then optionally be dried by means of various methods, preferably, by sieving off excess aroma-bearing liquid or thermally in a baking oven at 90-130° C., preferably, at 120° C.

Furthermore, the object of the present invention is achieved according to a second teaching, with which the wood particles, which have been treated by the method according to the invention, for the production of alcoholic beverages, wherein the wood particles according to the invention may optionally be aromatised and wherein the wood particles may be used once or more than once for the treatment of alcoholic beverages.

The object of the present invention is also achieved according to a third teaching with which the use of the wood particles according to the invention for the production of alcoholic beverages comprises the following steps:

a) the provision of an alcoholic beverage with wood particles according to the invention, which may optionally be aromatised, wherein the wood particles may have been newly prepared or already used for alcoholic beverage treatment, and optionally wherein the alcoholic beverage may already have been stored in a barrel;

b) the incubation of the alcoholic beverage with the wood particles according to the invention;

c) removing the wood particles according to the invention from the alcoholic beverage incubated therewith;

d) optionally, the further storage of the incubated alcoholic beverage in a barrel, preferably, in an oak barrel, more preferably in a barrel of American oak;

e) alternatively optionally one or more further incubations of the alcoholic beverage with wood particles according to the invention, wherein the wood particles according to the invention may optionally be aromatised and wherein the wood particles may have been newly prepared or already used for beverage treatment.

According to one embodiment of the inventive use of the wood particles according to the invention, the alcoholic beverage is provided with at least 10 g per liter of wood particles according to the invention, preferably with 10 g to 70 g per liter of wood particles according to the invention.

Preferably, when using the wood particles according to the invention, the incubation of the alcoholic beverage with the wood particles according to the invention under agitation may take about 3 hours to 3 months or longer, preferably about 4 to 24 hours, more preferably, about 6 to 14 hours.

The object of the present invention is further achieved according to a fourth teaching, which provides an apparatus for using the wood particles according to the invention for the production of alcoholic beverages, comprising the following components:

a) a stirring unit for receiving an alcoholic beverage;

b) a sieve unit for receiving wood particles according to the invention; wherein the stirring unit, preferably, has an anchor stirrer and/or wherein the sieve unit, preferably, comprises a wire mesh; and/or wherein the apparatus can hold several hundred liters of alcoholic beverage for the treatment with wood particles according to the invention, and/or wherein the wood particles according to the invention may optionally be aromatised.

Advantages of the Invention

It has surprisingly and advantageously been found that the method according to the invention for treating wood particles for the production of alcoholic beverages makes it possible to produce quickly, easily, reliably, technically easily realizable, easily scalable and cost-effective wood particles, which are optimized for the production of different alcoholic beverages, and thus can be used in many ways. In addition, it is advantageously ensured by the method according to the invention that no (undesired) foreign substances, such as, for example, enzymes or other auxiliaries, are introduced into the alcoholic beverages to be treated. As shown by the exemplary embodiments, the wood particles according to the invention are as best suited for the production and refinement of various alcoholic beverages, for example, also, for the production and refinement of whiskys.

The method of the present invention is technically readily scalable, as long as the basic principles of sufficient water, cooking temperature, agitation, and subsequent toasting of the wood particles are followed, wherein the washing of the wood particles with water under agitation should take place at least 60° C., preferably at least 80° C., more preferably at least 95° C., wherein preferably the washing of the wood particles with water under agitation should be for more than 1 h, preferably for more than 5 h, more preferably for more than 8 h, wherein the washing of the wood particles with water under agitation is done, preferably, with more than 5 liters of water per kg wood particles, preferably, with more than 10 liters of water per kg of wood particles, more preferably with more than 12 liters of water per kg wood particles.

It can be assumed that the use of temperatures above the atmospheric boiling point under pressure, for example, in extraction apparatuses, as used in the chemical industry, further increase in efficiency can be achieved. Furthermore, extractions with non-aqueous solvents, for example, analogous to coffee-decaffeination, are conceivable. However, it must be ensured that, for example, during the course of toasting, even the tiniest traces of the solvent are completely removed from the wood particles.

Surprisingly and advantageously, with the wood particles according to the invention, one can produce, for example, even high-quality products such as single malt whiskys, blended whiskys, etc. easily, reliably, quickly (for example, in a few days), of high quality, cost-effective, with variable aroma diversity, without great technical effort and easily scalable, therefore, also, in an industrial method. Furthermore, surprisingly and advantageously, other alcoholic beverages, such as, for example, wine or plum schnapps, may also be produced easily, reliably, quickly (for example, in a few days), of high quality, cost-effective, with variable aroma diversity, without great technical effort, and easily scalable.

Moreover, the wood particles according to the invention, for the production of alcoholic beverages can surprisingly and advantageously be used just once or several times and they are surprisingly and advantageously easily incubated with an aroma-bearing liquid for the easy and varied aromatising of alcoholic beverages, such as, for example, whiskys.

Furthermore, with the wood particles according to the invention, more and less expensive high quality products such as, for example, single malt whiskys, blended whiskys, etc., can be produced (worldwide), and, therefore, more and less expensive high quality products can be brought to the market and more consumers can enjoy these high quality products.

The wood particles according to the invention, which are treated by the method according to the invention, have further advantages. They are characterized by a high surface area with high loading of desirable aromas such as caramel and vanilla substances, as well as a very low level of tannin and other undesirable aromas. In addition, these wood particles according to the invention may be carriers of numerous additional aromas, such as, for example, of sherry, of port wine, or of other beverages with characteristic and—for example, whisky-harmonizing taste, which is not accompanied by troublesome tastes.

For the extraction of tannins and other aromas of the wood, the agitation of the wood particles as well as the water, if possible, near the cooking temperature of at least 60° C., preferably at 80° C., and most preferably at 95° C., play a crucial role. Method experiments with water at cooking temperature without agitation of the wood particles provided unsatisfactory extraction results of the wood particles, with the result that subsequently treated alcoholic beverages had an offensive bitter taste (see the comparative examples 1a and 3a).

The wood particles are, preferably, of oak wood, and more preferably, of American oak wood, which has less tannin, because this wood is better suited for a method which requires the lowest possible final content of elutable tannin, than those of European oak wood, which are more rich in tannins. Even if it can not be ruled out, that suitable wood particles can be made from European oak wood particles by means of more intensive aqueous extraction, such as, with further washes or by extraction at temperatures above the atmospheric cooking temperature under pressure, American oak wood remains preferred for process economic reasons, and, therefore, was used in the examples of the invention, but is not intended to limit the scope of the present invention in any way.

The use according to the invention of the wood particles according to the invention can also be combined, before or after, with a barrel aging of an alcoholic beverage, in order to achieve special additional taste- or color-effects for the alcoholic beverage. Here, too, the advantages of the method according to the invention are retained. Because, as a rule, a few weeks of barrel aging are sufficient for the alcoholic beverage in order to obtain an additional effect for treatment with the wood particles according to the invention.

It would also be conceivable, to carry out first barrel aging of whisky for three years and one day, followed by a treatment with the wood particles according to the invention, in order to bring the still immature whisky to a similar maturity state, which corresponds to ten years or more of barrel aging. In addition, then the legal name "whisky" would be permissible.

In addition, it has surprisingly and advantageously been found that with the apparatus according to the invention for using the wood particles according to the invention, a variety of alcoholic beverages are easily, reliably, quickly (for example, in a few days), of high quality, cost-effective, with variable aroma diversity, without great technical effort and easily scalable, produced, which, for example, may resemble alcoholic beverages, stored for several months, such as, for example, whiskys.

Thus, surprisingly and advantageously with the apparatus according to the invention for using the wood particles according to the invention, it is also possible to obtain high-quality products such as, for example, single malt whiskys, blended whiskys, etc. easily, reliably, quickly (for example, in a few days), of high quality, cost-effective, with variable aroma diversity, without great technical effort and easily scalable, which, may resemble whiskys, which have been stored for several months in a barrel oder which, may even resemble whiskys of many years of barrel aging.

The described teachings, findings, methods, and uses are not limited to whisky, but can also be applied to other alcoholic beverages, such as, for example, fruit brandies, rum, cognac, gin, wine etc., and they are not intended to limit the scope of the present invention in any way.

In the following, the invention will be further described by means of preferred embodiments, which are given for illustrative purposes only and are not intended to limit the scope of the present invention in any way.

Example 1: Production of wood particles according to the invention 1 kg of toasted oak chip granules (wood particles AO DR from Eder, Bad Dürkheim/D, of American oak, heavily toasted) is enclosed in a laundry bag made of polyamide fabric, washed 3×3 hours in a commercial household washing machine at 95° C., only with water without the addition of laundry and other aids, and spinned-off. The humid granules are removed from the laundry bag and spread evenly in about 1 cm thick layers on several baking trays equipped with small holes. First, the granules are dried at 195° C. for 20 minutes, then toasted in the same oven. Here, 45-60 minutes at 180-200° C. have shown to be sufficient and taste-optimal. The result are wood particles according to the invention.

Comparative Example 1a: Extraction without Agitation 1 kg of the oak chip granules used in example 1 (wood particles AO DR from the company Eder, Bad Durkheim/D, of American oak, heavily toasted) are boiled in a cooking pot for 3×3 hours with 5 liters of fresh water without the addition of laundry and other aids and without agitation, then subsequently sieved-off. Drying and toasting are carried out as in Example 1.

Example 2: Preparation of Aromatised Wood Particles According to the Invention with Port Wine Aroma 500 grams of the treated, dried and toasted granules (wood particles according to the invention) of example 1 are placed in a jar and topped with 500 ml of commercial port, so that all of the granules are wetted therewith. The mixture is stored in the sealed glass jar for 2 months. The granules are then removed by sieving from excess port wine and dried on a perforated baking tray in the oven for 30 minutes at 120° C. This results in aromatised wood particles according to the invention with port wine aroma.

Example 3: Single Malt Whisky with Wood Particles According to the Invention 400 ml of an unripened whisky distillate with 63% by volume alcohol (basis:beech smoke barley malt from the company Weyermann, Bamberg/D) are filled into a glass bottle together with 12 grams (30 grams/liter) of wood particles according to the invention. The bottle is stored horizontally and occasionally agitated to ensure sufficient contact between distillate and wood particles. After 18 hours, the distillate lost its pungency even at 63% by volume of alcohol and assumed a pleasant fruity taste with a slightly smoky finish. The tannin aftertaste is rather low and well below that of its high market standard single malt whiskys, used for comparison.

Comparative Example 3a: Single Malt Whisky with Wood Particles Produced without Agitation The experiment according to Example 3 is repeated with the wood particles from Comparative Example 1a. After 18 hours, a beverage, similar to that of Example 3 results, but the tannins-related bitter taste is much more pronounced.

Example 4: Single Malt Whisky with Wood Particles According to the Invention The experiment is carried out as in Example 3, however, 16 grams (40 grams/liter) of wood particles according to the invention are added to the distillate. The result described in Example 3 occurs already after 12 hours.

Example 5: Single Malt Whisky with Aromatised Wood Particles According to the Invention The experimental set-up is as in Example 4, except that 16 grams (40 grams/liter) of aromatised wood particles according to the invention are used. The result is a mild, fruity whisky with port wine aroma.

Example 5a: Single Malt Whisky from Multiple Treatment with Wood Particles According to the Invention The experimental set-up is as in Example 5, but the aromatised wood particles according to the invention are not used for untreated distillate but for the distillate of Example 4, which was already treated with (non-aromatised) wood particles according to the invention. The result is a very mature, very mild, very fruity whisky with port wine aroma.

Example 6: Single Malt Whisky with Wood Particles According to the Invention with Prolonged Treatment Duration The experimental set-up is as in Example 3, but the duration of treatment is extended to 3 months. The result is a whisky with a strong taste and a distinctive woody aroma, similar to that of a Scottish single malt whisky with very long barrel aging (for example, of 21 years).

Example 7: Single Malt Whisky from Short-Term Barrel Aged Distillate with Wood Particles According to the Invention 400 ml of a distillate with 50% by volume alcohol based on several barley malts, which has already been for 4 weeks in a used bourbon barrel from the company Eder, Bad Durkheim/D, is put in a bottle provided with 8 grams (20 grams/liter) of wood particles according to the invention. Already, after 6 hours, a mild, large, fruity whisky results, with a long-lasting smoky finish, which, for example, is blind tasted with a variety of top Scottish whiskys as "very good".

Example 8: Single Malt Whisky from a One-Year Barrel-Aged New Spirit with Wood Particles According to the Invention 400 ml of the "Hot Stone new make, sherry matured", with 50.7% by volume alcohol, of the company Destillerie Weutz GmbH, St. Nikolai i.S., Styria/Austria, aged for 1 year in a European sherry barrel, are provided in a bottle with 8 grams (20 grams/liter) of wood particles according to the invention. Already after 6 hours, a mellow, voluminous, fruity whisky with a long-lasting finish results, and its tannin aroma has been preserved in part because of its one-year storage in tannin-rich European oak barrels.

Example 9: Single Malt Whisky from Fresh Distillate with Aromatised Wood Particles According to the Invention 200 ml of "Young Deer" New Spirit Classic 64% of the company Langatun Distillery AG, Aarwangen/Bern/Switzerland are provided in a bottle with 8 grams (40 grams/liter) of aromatised wood particles according to the invention. Already after 8 hours, a mild, very fruity whisky results.

Example 10: Single Malt Whisky from Fresh Distillate with Extended Treatment Time And with Aromatised Wood Particles According to the Invention 200 ml "Young Deer" New Spirit Classic 64% from the company Langatun DistilleryAG, Aarwangen/Bern/Switzerland, are provided in a bottle with 6 gram (30 grams/liter) of aromatised wood particles according to the invention. After one week a mild, fruity whisky with port wine aroma and a strong woody aroma results, but without any disturbing bitter taste in the finish.

Example 11: Taste Improvement of a 6-Year Old Single Malt Whisky 200 ml of a 40% single malt whisky, available on the market, aged for 6 years in bourbon- and chardonnay-barrels, are provided in a bottle with 4 grams (20 grams/liter) of aromatised wood particles according to the invention. Already after 6 hours, the whisky has become much more fruity and considerably milder. Its originally strong tannin aroma is less distinctive.

Example 12: Blended New Spirit 100 ml of the distillate, used in Examples 3-5, at 63% by volume alcohol and (due to the lack of pure 96% drinking alcohol in Switzerland) 150 ml Vodka at 40% by volume is provided with 10 g (40 g/Liter) of aromatised wood particles according to the invention. Already after just 10 hours, a pleasantly aromatised, mild blended whisky of the upper market standard quality segment results.

Example 13: Improvement of Low Grade Plum Schnapps 200 ml of low quality plum schnapps (Häfelibrand) at 40% alcohol by volume is added and stored with 4 grams (20 grams/liter) of wood particles according to the invention for 12 hours. As a result, plum schnapps loses most of its sharp aroma and has a much fuller and rounder aroma than the starting material.

Example 14: Replacement of Oak Barrel Aging for Wine 200 ml of a Weissburgunder white wine matured in steel tanks (2016er Weißburgunder tradition of the winery Stefan Potzinger, Gabersdorf/Styria/Austria) at 12.5 vol.-% alcohol are provided with 4 grams (20 grams/liter) of wood particles according to the invention. After 12 hours, a wine results with a subtle note of wood, with reduced fruitiness, similar to wines, stored for several months in a 2000-liter oak barrel.

Example 15: Stirrer Apparatus for the Use of Wood Particles According to the Invention For the use of the wood particles according to the present invention on an industrial scale, a standing 500 liter stainless steel apparatus is required with a closable lid and a slowly running anchor stirrer or another stirrer. Special mobile means in form of baskets, made of stainless steel wire mesh or other sieve units, which, for example, are attached to hooks, to the agitator shaft, and the stirrer arms, are intended to receive the wood particles according to the invention, and to draw them slowly through the liquid to be treated by means of a stirrer. Thus, a uniform contact of liquid and wood particles according to the invention is always guaranteed.

The invention has been described in detail with reference to exemplary embodiments. However, it will be understood by those skilled in the art that changes may be made to these exemplary embodiments without departing from the principles and spirit of the invention, the scope of which is defined in the appended claims and their equivalents.

What is claimed is:

1. A method for preparing an alcoholic beverage, the method comprising:
    filling a container with a distillate and treated wood particles in an amount of from about 20 to about 40 grams of treated wood particles per liter of distillate;
    agitating the container to improve contact between the distillate and the treated wood particles; and
    incubating the distillate with the treated wood particles in the container for a period of time of from about 4 to about 24 hours,
    wherein the treated wood particles are wood particles prepared by:
    forming wood particles into wood chips;
    optionally toasting the wood chips to prepare toasted wood chips;
    washing the optionally toasted wood chips with only water at a temperature of at least 80° C. for more than 1 hour to prepare washed wood chips, wherein more than 5 liters of water are used per kg of optionally toasted wood chips;
    removing the water from the washed wood chips to produce first washed wood chips;
    washing the first washed wood chips at least a second time with only water at a temperature of at least 80° C. for more than 1 hour to produce at least second washed wood chips, wherein more than 5 liters of water are used per kg of first washed wood chips;
    removing the water from the at least second washed wood chips to prepare final washed wood chips;
    drying the final washed wood chips to prepare the treated wood particles.

2. The method of claim 1, wherein agitating the container to improve contact between the distillate and the treated wood particles comprises occasional agitation.

3. The method of claim 1, wherein the container comprises glass or stainless steel.

4. The method of claim 1, wherein incubating the distillate with the treated wood particles in the container comprises:
    incubating the distillate with first treated wood particles;
    removing the first treated wood particles from the distillate incubated therewith; and
    incubating the distillate with second wood particles.

5. The method of claim 4, wherein the first treated wood particles are newly prepared treated wood particles for alcoholic beverage treatment, and
    wherein the second wood particles are already used wood particles for alcoholic beverage treatment.

6. The method of claim 1, wherein incubating the distillate with the treated wood particles in the container comprises:
    incubating the distillate with first treated wood particles; and
    incubating the distillate with second wood particles prepared by incubating treated wood particles according to claim 1 with an aroma-bearing liquid, removing excess liquid, and drying.

7. The method of claim 1, wherein the distillate is stored in a barrel prior to the filling the container with the distillate and the wood particles.

8. The method of claim 7, wherein the barrel is a tannin-rich European oak barrel.

9. The method of claim 7, wherein the barrel is a bourbon barrel or a chardonnay barrel.

10. The method of claim 1, the method further comprising:
    removing the treated wood particles from the distillate incubated therewith; and
    storing the distillate in a barrel of American oak.

11. The method of claim 1, wherein the alcoholic beverage is an alcoholic beverage other than wine.

12. The method of claim 1, wherein the treated wood particles are further incubated with an aroma-bearing liquid, excess liquid is removed, and the wood particles are dried.

13. The method of claim 1, wherein filling the container comprises filling the container with 20 grams to 30 grams of treated wood particles per liter of the distillate.

14. The method of claim 1, wherein the wood chips have an edge length of about 2 mm.

15. The method of claim 1, wherein incubating the distillate with the treated wood particles in the container for comprises incubating for 6 hours to 14 hours.

16. The method of claim 1, wherein the container comprises a lid and a stirrer and is a stainless steel apparatus or a barrel.

17. A method for preparing a single malt whisky, the method comprising:
filling a container comprising glass or stainless steel with a whisky distillate and treated wood particles in an amount of from about 30 to about 40 grams of treated wood particles per liter of whisky distillate;
agitating the container to improve contact between the whisky distillate and treated wood particles; and
incubating the whisky distillate and the treated wood particles in the container for a period of time of from about 3 hours to about 3 months,
wherein the treated wood particles are wood particles prepared by:
forming wood particles into wood chips;
optionally toasting the wood chips to prepare toasted wood chips;
washing the optionally toasted wood chips with only water at a temperature of at least 80° C. for more than 1 hour to prepare washed wood chips, wherein more than 5 liters of water are used per kg of optionally toasted wood chips;
removing the water from the washed wood chips to produce first washed wood chips;
washing the first washed wood chips at least a second time with only water at a temperature of at least 80° C. for more than 1 hour to produce at least second washed wood chips, wherein more than 5 liters of water are used per kg of first washed wood chips;
removing the water from the at least second washed wood chips to prepare final washed wood chips,
drying the final washed wood chips to prepare the treated wood particles.

18. The method of claim 17, wherein the treated wood particles are used for an alcoholic beverage treatment prior to the filling the container comprising glass or stainless steel with the whisky distillate and the treated wood particles.

19. The method of claim 17, wherein the treated wood particles are further incubated with an aroma-bearing liquid, excess liquid is removed, and the wood particles are dried.

20. The method of claim 17, wherein the treated wood particles comprise American oak particles.

* * * * *